Oct. 6, 1959　　　　D. W. BROUS　　　　2,907,495
LIQUID DISPENSING MACHINE
Filed Jan. 19, 1956　　　　　　　　　　5 Sheets-Sheet 1
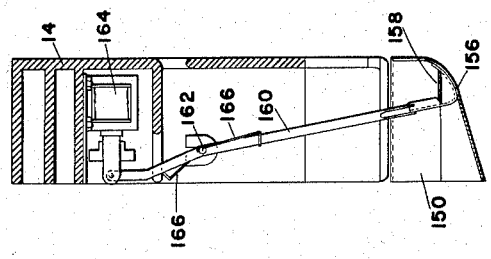
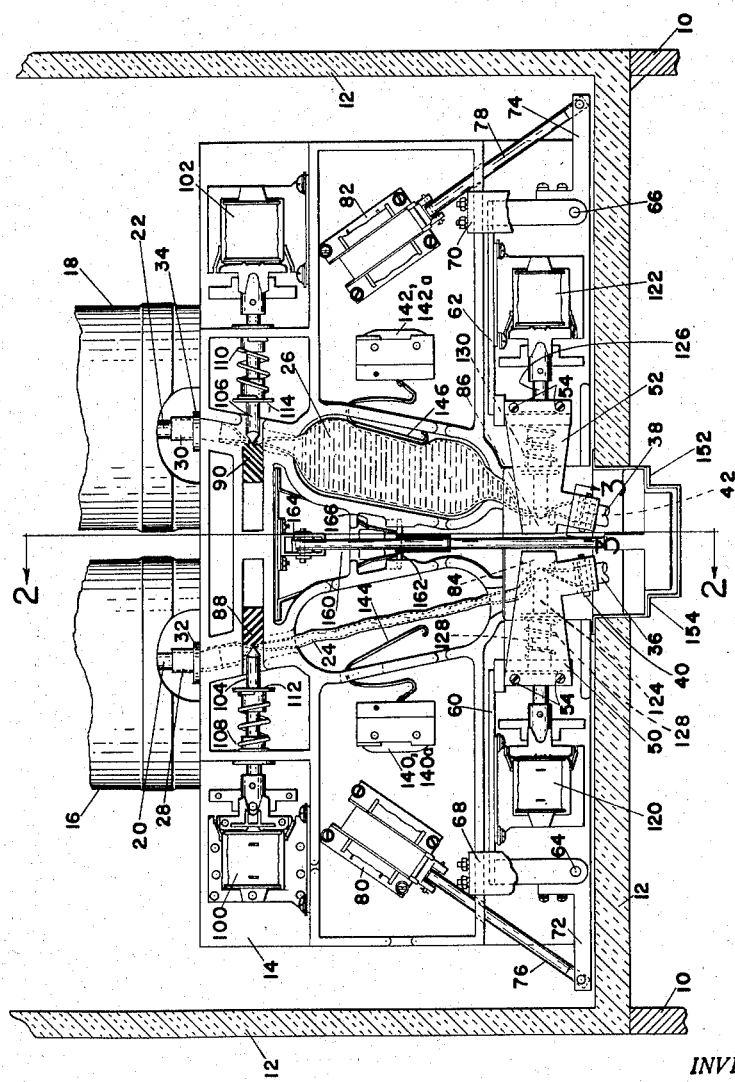
INVENTOR.
Donald W. Brous
BY
R. W. Furlong
ATTY.

Oct. 6, 1959 — D. W. BROUS — 2,907,495
LIQUID DISPENSING MACHINE
Filed Jan. 19, 1956 — 5 Sheets-Sheet 2

INVENTOR.
Donald W. Brous
BY R. W. Furlong
ATTY.

Oct. 6, 1959     D. W. BROUS     2,907,495
LIQUID DISPENSING MACHINE
Filed Jan. 19, 1956     5 Sheets-Sheet 3
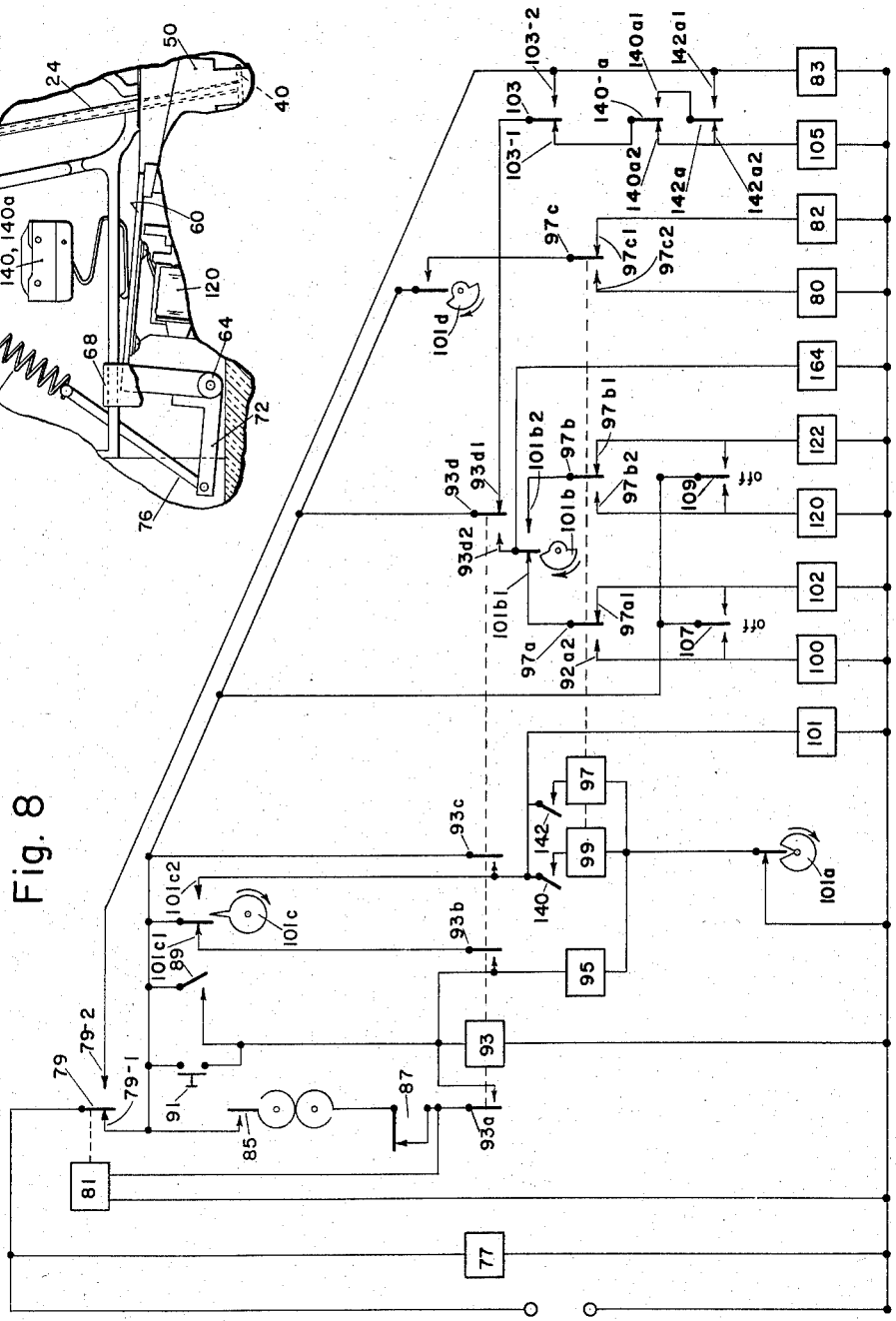
INVENTOR.
Donald W. Brous
BY
R. W. Furlong
ATTY.

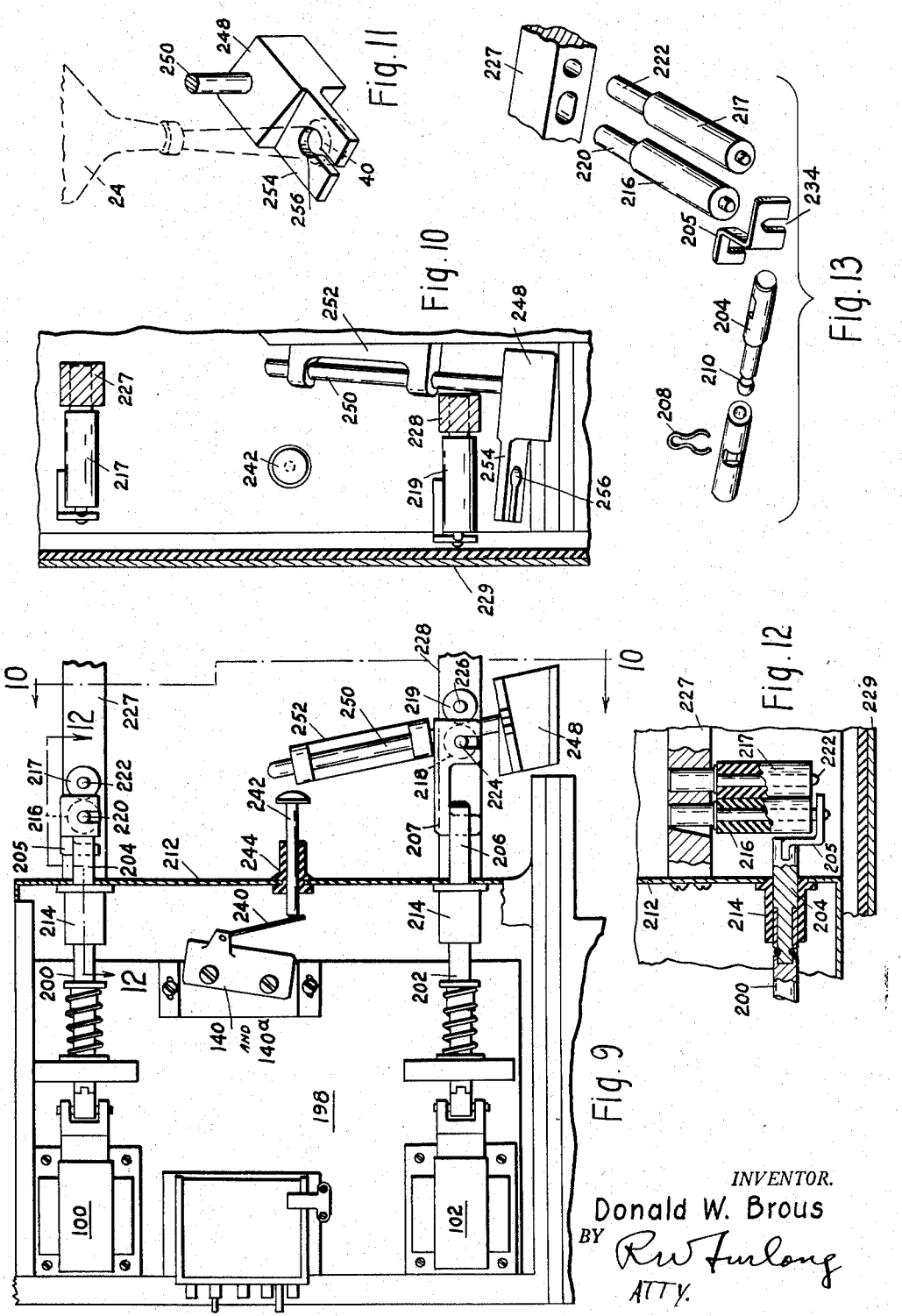

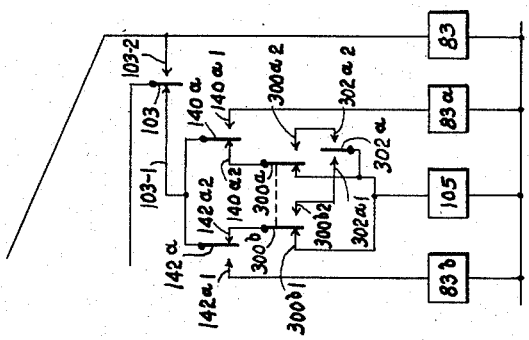
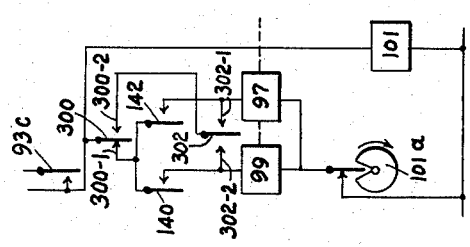
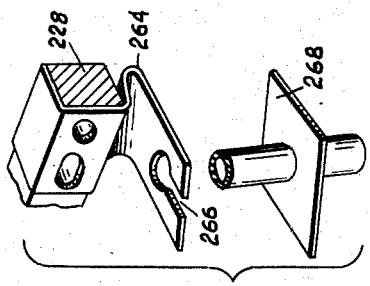
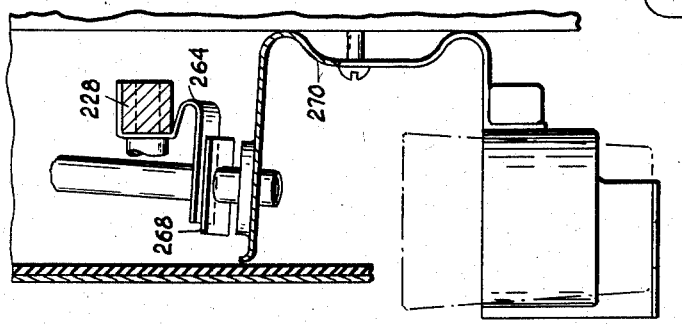
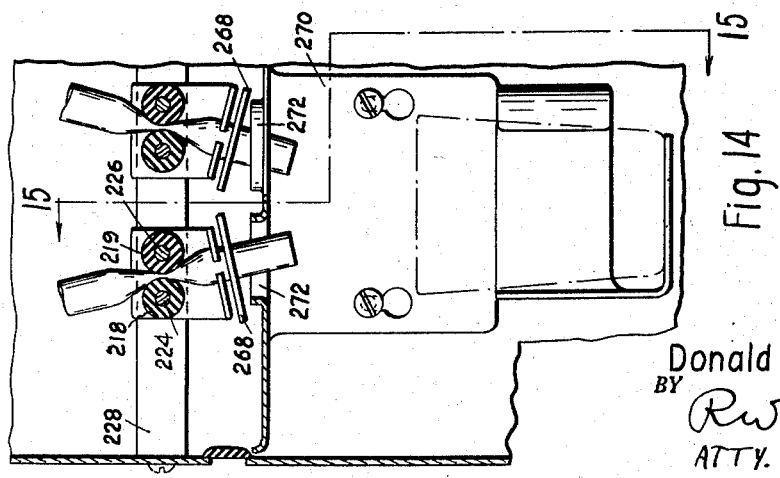

United States Patent Office 2,907,495
Patented Oct. 6, 1959

2,907,495

LIQUID DISPENSING MACHINE

Donald W. Brous, Peterborough, N.H., assignor to Food Engineering Corporation, Manchester, N.H., a corporation of New Hampshire Application January 19, 1956, Serial No. 560,184

15 Claims. (Cl. 222—63)

This invention relates to a liquid dispensing machine and pertains more specifically to a vending machine for dispensing a measured quantity of a beverage such as milk, orange juice, coffee or the like at each actuation thereof.

One object of the invention is to provide a liquid dispensing machine of compact and simple construction.

Another object is to provide such a machine for dispensing refrigerated beverages in which both the supply tank containing the beverage and the dispensing means are entirely enclosed within a refrigerated chamber having an outlet aperture.

Still another object is to provide such a machine in which the outlet aperture of the refrigerated chamber is closed with a movable closure and in which means is provided for shifting the closure in timed relation to the actuation of the dispensing mechanism so that the aperture is open while the beverage is being dispensed and is closed again after completion of each dispensing operation, the closure serving also as a drip deflector when closed.

A further object is to provide a disposable, flexible, collapsible measuring container for a beverage dispensing machine, the container having a sterile interior and being hermetically sealed until placed in the machine ready for operation.

Still a further object is to provide a beverage dispensing machine having a flexible, collapsible measuring container with means for sealing the inlet and outlet of the measuring container in timed sequence so as to fill the container by gravity from the supply tank, then dispense the contents of the container while sealing off the supply tank.

Another object is to provide a dispensing machine having means for stretching the measuring container between its inlet and outlet during the dispensing step so as to facilitate and accelerate discharge of the contents thereof.

Still another object is to provide a beverage dispensing machine having a plurality of beverage supply tanks, means for dispensing a measured quantity of beverage from each supply tank, and means responsive to the beverage being discharged from each tank for transferring operation from one tank to another when the supply in one tank is exhausted or when the supply is interrupted for any other reason.

Another object is to provide a beverage dispensing machine in which both the beverage supply tank and all dispensing mechanism which comes into contact with the beverage are enclosed within a chamber, and in which all moving parts of the machine within the chamber are readily removable without the use of tools.

Other and further objects will be apparent from the drawings and the description which follows.

In the drawings:

Fig. 1 is a view in vertical elevation, partly cut away and in section, of one embodiment of the invention;

Fig. 2 is a view in section taken along the line 2—2 of Fig. 1;

Fig. 7 is a view similar to Fig. 1 of a portion of the machine showing a modification of the invention;

Fig. 8 is a circuit diagram showing the circuitry employed to actuate the machine shown in Figs. 1 to 6;

Fig. 9 is a view in vertical section similar to Fig. 1 of a portion of the machine showing still another modification;

Fig. 10 is a view in section taken along the line 10—10 of Fig. 9;

Fig. 11 is an isometric view partly broken away showing the container-stretching member;

Fig. 12 is a view taken along the line 12—12 of Fig. 9;

Fig. 13 is an exploded view showing the various parts of Fig. 12 prior to assembly;

Fig. 14 is a view in vertical elevation, partly broken away and in section, showing still another modification of the invention;

Fig. 15 is a view taken along the line 15—15 of Fig. 14;

Fig. 16 is an exploded view showing the stretching spring and flanged outlet tube; and Figs. 17 and 18 are partial circuit diagrams showing modifications of the circuit of Fig. 8.

Figure 6:
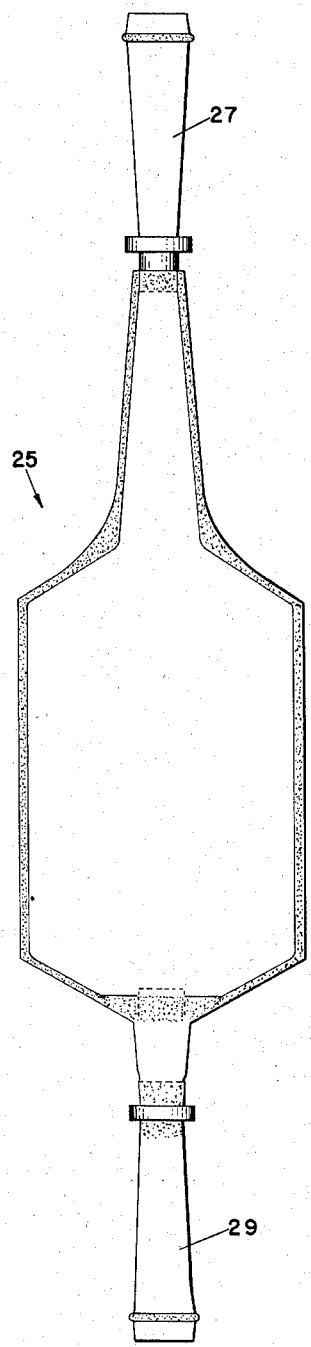
Fig. 6 is a view in front elevation of a disposable, flexible, collapsible measuring container with its ends hermetically sealed prior to use in the machine.
Figure 3:
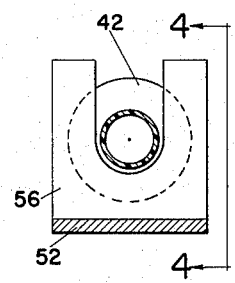
Fig. 3 is a view taken along the line 3—3 of Fig. 1.
Figure 4:
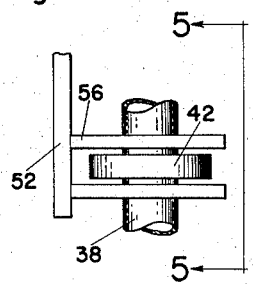
Fig. 4 is a view taken along the line 4—4 of Fig. 3.
Figure 5:
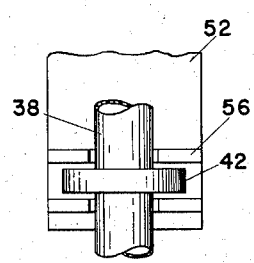
Fig. 5 is a view taken along the line 5—5 of Fig. 4.

As shown in Fig. 1, the machine comprises a main frame 10 supporting a chamber having heat insulated walls 12, 12 and having an aperture in its bottom wall. In the case of beverages which require refrigeration or heating, the chamber may be cooled or heated by any suitable means (not shown). Within the chamber is mounted a subframe 14 together with a pair of conventional dispenser milk cans 16, 18. Each can is provided with a recess adjacent its lower end in which is mounted a projecting nipple 20, 22 to which is connected control means for controlling the dispensing of milk or other beverage contained in cans 16, 18, the control means including a conduit in the form of a flexible, collapsible measuring container 24, 26, each container being connected to its respective nipple by frictional engagement of tubular inlets 28, 30 over the end of the nipple. As best seen in Fig. 6, each tubular inlet 28, 30 is provided with a relatively rigid annular flange 32, 34 secured thereto which is adapted to rest upon the upper face of subframe 14. Each container 24, 26 is likewise provided with a tubular outlet 36, 38 also having a relatively rigid annular flange 40, 42 secured thereto. Cover plates 50, 52 are secured by means of screws 54, 54 to hanger arms 60, 62, respectively, each cover plate carrying a container-mounting element or clamp 56 extending at approximately right angles to the plane of the plate, as best seen in Figs. 3, 4 and 5. Mounting element 56 comprises two pairs of spaced opposing legs adapted to engage between them flange 42 secured on tubular outlet 38.

Hanger arms 60, 62 are pivoted at 64, 66 to brackets 68, 70 bolted to subframe 14 and carry outwardly extending brackets 72, 74 at each end thereof, the outer end of each bracket being connected by means of linkage 76, 78 to a solenoid 80, 82 secured to subframe 14.

Mounted on subframe 14 adjacent each tubular inlet and outlet of measuring containers 24, 26 are four resilient stops or sealing pads of rubbery resilient material 84, 86, 88, 90. Mounted on opposite sides of subframe 14 adjacent the inlets of containers 24, 26 are solenoids 100, 102, each of which is provided with a plunger 104, 106 extending through aligned apertures in subframe 14.

Compression springs 108, 110 are mounted around plungers 104, 106 between a portion of subframe 14 and collars 112, 114 secured to plungers 104, 106, which urge the plungers against stop pads 88, 90 to pinch tubular inlets 28, 30 between the ends of the plungers and their respective pads, thus sealing the respective inlets. The solenoids 100, 102 are so arranged that energization thereof compresses springs 108, 110 to withdraw plungers 104, 106 and open inlets 28, 30.

Similarly, another pair of solenoids 120, 122 is mounted on hanger arms 60, 62, plungers 124, 126 being similarly urged toward corresponding pads 84, 86 by means of compression springs 128, 130 mounted on the plungers.

Also mounted on subframe 14 are two pairs of limit switches 140, 140a and 142, 142a having spring loaded feeler arms 144, 146, respectively, extending into close proximity with flexible measuring containers 24, 26 and adapted to be actuated by the filling and emptying of the respective containers 24, 26.

The outlet aperture in the bottom wall 12 of the insulated chamber is provided with a protective housing 150 secured to bottom wall 12 and having opposed shoulder portions 152, 154 and an aperture 156 (see Fig. 2) in its lower forward portion. A closure 158 for the aperture is mounted for sliding movement on shoulders 152, 154 to and from a position in which aperture 156 is sealed or closed, closure 158 being shown in the closed position in Fig. 2. A lever arm 160 is pivoted at 162 on subframe 14, the lower end of lever arm 160 being provided with a yoke for engaging the upper rear portion of closure member 158 while the upper end of lever arm 160 is pivotally connected to the plunger of a solenoid 164 mounted on subframe 14. Spring 166 yieldably urges the lower end of lever arm 160 forwardly so as to close aperture 156 by means of closure 158, solenoid 164 being so arranged that energization causes closure 158 to be retracted so as to open aperture 156 to permit the dispensing of liquid from either tubular outlet 36 or 38 into a cup or other container disposed therebeneath upon a suitable platform (not shown). It will be noted that the shape of closure 158 is such that any drops of liquid which may accidentally fall from outlets 36 or 38 when the machine is not in operation and closure 158 is in closed position will be deflected rearwardly and downwardly along the sloping bottom of housing 150, from which they may pass into a waste container (not shown).

The foregoing arrangement not only ensures that both the liquid supply cans and the measuring containers are kept at the desired temperature at all times, since the outlet aperture of the insulated chamber is opened only momentarily during dispensing of the liquid, but also prevents accumulation of waste liquid in the delivery area of the machine. This feature is particularly important in the case of such beverages as milk, the dispensing of which requires rigid control of refrigeration and sanitary conditions.

In operation of the machine, liquid is withdrawn from only one of the supply cans at a time, the arrangement being such that repeated actuation of the machine causes successive withdrawals of a measured quantity of liquid from one supply can only until the supply in that can is exhausted, whereupon operation of the machine is automatically transferred to the other supply can.

As shown in Fig. 6, each of the flexible, collapsible measuring containers 24, 26 comprises a thin-walled sack 25 of flexible plastic material, preferably polyethylene film having a thickness of not over five mils, preferably from three to five mils, having a tubular inlet and a tubular outlet of the same material. At least the inlet tube is of gradually increasing cross-sectional diameter in a direction toward the sack in order to facilitate filling of the sack and elimination of air bubbles from the sack. The relatively thick and rigid annular flanges secured to both inlet and outlet are also preferably formed of a plastic material such as polyethylene and serve both to support or mount the flexible container in operating position in the machine and as a means for constricting the container, by stretching it between the flanges, during the dispensing step so as to expedite delivery of the contents of the container.

The container may readily be fabricated by heat-sealing together the margins of two flat sheets of polyethylene cut to the desired pattern. The interior of the container may readily be sterilized as by heating, following which both the inlet and outlet may be hermetically sealed as by heat-sealing at 27, 29 (Fig. 6), thus maintaining sterile conditions within the container until ready for use. Preferably, however, the container is first hermetically sealed, then sterilized by electron bombardment. Seal 27 may be torn off at the time the container is connected to the outlet nipple of a dispensing milk can or the like, an operation which is preferably carried out with careful control of sanitary conditions; for example, in the case of milk, at a dairy. Seal 29 is preferably left intact until the container is installed in operating position in the machine, the can being shipped with the container in rolled-up form in the recess or cavity in which the outlet nipple is located and preferably being protected with a removable cover plate. Because of their inexpensive lightweight construction, these flexible measuring containers need not be used more than once and are readily disposable.

The machine may be modified, as shown in Fig. 7, by replacing stretching solenoid 80 with tension spring 71 which continuously maintains a stretching tension upon flexible measuring container 24 through linkage 76, bracket 72, and hanger arm 60 pivoted on bracket 68. The stretching of container 24 by spring 71 facilitates collapse of the container and dispensing of its contents when outlet 36 is open, and the tension of spring 71 is so adjusted that the filling of container 24 when inlet 28 is open, and the consequent swelling and contraction in length of container 24 is sufficient to overcome the tension of the spring and draw hanger arm 60 back to horizontal position. In this modification, also, switches 140, 140a are mounted so that switch arm 144 bears against and is actuated by hanger arm 60 instead of directly against the wall of container 24. Similarly, stretching solenoid 82 may be replaced with a tension spring and switches 142, 142a may be arranged so that switch arm 146 bears on hanger arm 62.

Further modifications of the invention are shown in Figs. 9–13 in which the solenoids and limit switches are all mounted outside the insulated chamber and all of the moving parts within the chamber are readily removable without the use of tools. For the sake of convenience, only the left-hand portion of the machine of this modification is shown in Fig. 9, but it will be understood that the right-hand portion is arranged in the same way. In this modification solenoids 100, 120 are mounted on a panel support member 198 located outside of the insulated chamber and solenoid plungers 200, 202 are recessed at their ends to receive actuating arms 204, 206. The latter are releasably held in place by means of spring clips 208, 208 mounted on plungers 200, 202 and extending through apertures in the walls thereof to seat in annular grooves 210, 210 in actuating arms 204, 206. The actuating arms extend through apertures in wall 212 into the insulated chamber, metal bushings 214, 214 with nylon inserts being provided to seal the apertures through which the arms pass.

In this modification measuring container 24 is closed at each end by a pair of resilient rubber rollers 216, 217, 218, 219 rotatably mounted on shafts 220, 222, 224, 226. Shafts 222 and 226 are secured to cross bars 227, 228 as by soldering or welding, while shafts 220, 224 are mounted in the cross bars for lateral swinging movement in a horizontal plane. The front wall of the refrigerated chamber is in the form of a door 229 mounted on hinges (not shown) for ease of access to the chamber. The inner face of door 229 when closed also acts as a stop to prevent rolls 216, 217, 218, 219 from riding off their respective shafts. Shafts 220, 224 being mounted for swinging movement in a horizontal plane are engaged at their outer ends by vertical slots 234, 236 in the outer ends of linkages 205, 207, the inner ends of which are provided with depending tongues removably received in vertical slots in actuating arms 204, 206. Accordingly, in this embodiment, when solenoid 100 is energized, plunger 200 and actuating arm 204 are urged to the left as seen in Fig. 9, swinging roller 216 on shaft 220 away from roller 217 and opening the inlet to measuring container 24. When the solenoid is deenergized, compression spring 108 urges plunger 200 and actuating arm 204 to the right, swinging roller 216 against roller 217 to nip the inlet of measuring container 24 between them and effectively seal it. Rollers 218, 219 operate in analogous fashion to seal the outlet of measuring container 24.

Limit switches 140, 140a are likewise mounted on panel 198 and are provided with a spring loaded feeler arm 240 which abuts against movable plunger 242 slidably mounted in bushing 244 of rubber or plastic material mounted in an aperture in wall 212 of the insulated chamber. The head of plunger 242 is in a position to be engaged by measuring container 24 as it fills with milk or other beverage, thus actuating feeler arm 240.

In this modification, stretching solenoid 80 and its associated linkage and hanger arm are replaced by a simple gravity stretching device consisting of a weight 248 mounted on guide rod 250 which is mounted to slide freely in guide bracket 252 secured to the rear wall of the refrigerated chamber. Extending forwardly from weight 248 is a flange 254 provided with a keyhole slot 256 into which the outlet of container 24 is adapted to be inserted with flange 40 beneath flange 254 so that container 24 is constantly being subjected to stretching tension. Weight 248 is adjusted so that filling of container 24 when inlet 28 is open and the consequent swelling and contraction in length thereof is sufficient to overcome the force exerted by weight 248. Since rollers 216, 217, 218, 219 are all rotatably mounted, container 24 is free to contract or stretch in length even when the inlet and outlet are both sealed. In addition, drip deflector and closure 158 together with closure shifting solenoid 164 and the associated lever arm 160 are omitted.

There is shown in Figs. 14-16 still another embodiment in which the stretching solenoid 80 and its associated linkage and hanger arm are replaced by a leaf spring 264 which is removably clipped over lower cross bar 228 and is provided with a slot 266 to receive the outlet of container 24. In this embodiment also flange 268 on the outlet of the measuring container is enlarged to ensure that any moisture or condensate accumulating on the outside of the measuring container will not drip into the cup receiving the dispensed beverage but will be deflected.

A supplemental drip deflector and cup holder 270, as shown in Figs. 14 and 15, may be hung on supporting studs on the frame of the machine beneath the outlet, the top of the deflector being slanted rearwardly to cause any condensate to be directed to waste. Flanged apertures 272, 272 in the top of deflector 270 permits the stream of beverage being dispensed to flow into the cup. A cup may be supplied to the cup holder from any suitable conventional automatic cup dispenser (not shown).

There is shown in Fig. 8 a circuit for controlling the operation of the embodiment shown in Figs. 1 to 6, inclusive. As shown in Fig. 8, the device includes a conventional thermostatically controlled refrigerating compressor 77 connected to a suitable power source for refrigerating the insulating chamber. When hot beverage is to be dispensed, any suitable heating means (not shown) may replace the refrigerating unit. The control system or actuating means for the dispensing machine is powered from the same source through maintained contact switch 79 normally closed on contact 79-1, switch arm 79 being mounted on the shaft of motor 81 and arranged to close on contact 79-2 when motor 81 has run for a predetermined time, thus cutting off power to the control system and lighting indicator light 83. Motor 81 together with switch 79 constitute a safety cut-off, motor 81 being powered through normally closed timer switch 87 and through thermostat switch 85 which is arranged to close if the temperature in the refrigerated chamber rises above the desired level. In order to permit operation of the machine during the period when a fresh can of beverage is being cooled down to the required temperature, timer switch 87 may be opened manually, thus opening the circuit to motor 81. A conventional mechanical spring drive in timer switch 87 closes the switch after a predetermined time; e.g., two hours. If the temperature in the refrigerated chamber has not dropped by that time to the level required to open thermostat switch 85, or if it subsequently rises above that level, motor 81 is powered and serves to open switch 79 on contact 79-1 and closes it on contact 79-2, where it is maintained until manually returned to contact 79-1. When the machine is used for hot beverages, the operation will be reversed, obviously, to maintain the temperature above the desired minimum temperature.

A spring loaded coin switch 89 is arranged to be momentarily closed by a coin passing therethrough and is arranged in parallel with push button 91 which is provided for use by a serviceman in testing the machine. Vending relay 93, connected in series with coin switch 89, carries three normally open contacts 93a, 93b, and 93c, and a fourth contact 93d normally closed on contact 93d-1 and opened on contact 93d-2. In parallel with relay 93 is impulse counter 95 which indicates the number of cups of beverage which have been dispensed.

A latching relay 97 together with its associated release coil 99 carries three contacts 97a, 97b, and 97c normally closed on contacts 97a-1, 97b-1, and 97c-1, respectively, and open on contacts 97a-2, 97b-2, and 97c-1. Motor 101 carries fixed to its shaft four cams 101a-101d, each of which is arranged to actuate a switch associated therewith. The switches associated with cams 101b and 101c are double throw spring biased switches, while the remainder are single throw spring biased switches. At the beginning of each operating cycle of the machine before motor 101 is energized switch 101a is normally closed while 101d is normally open. Switches 101b and 101c are normally closed on contacts 101b-1 and 101c-1, respectively, and open on 101b-2 and 101c-2. Rotation of the cams is clockwise as shown in Fig. 8, all of the cams turning through a single revolution during each operating cycle of the machine.

Limit switches 140, 142 (Fig. 1) are arranged in series with release coil 99 and latching relay 97, respectively, both switches being normally held in open position by the distension of containers 24 and 26 when filled with milk or other liquid. Similarly, double throw limit switches 140a and 142a are normally held open on contacts 140a-1 and 142a-1 and are normally closed on contacts 140a-2 and 142a-2 by the filled containers 24, 26. Empty cup switch 103 is normally held closed on contact 103-1 by the stack of cups in a conventional cup dispenser (not shown). Switch 103 is spring biased to close on contact 103-2 when the supply of cups is exhausted, and is connected in series with signal light 83 and with a conventional coin changer 105. When the cup supply is exhausted, permitting switch 103 to close on 103-2, the power to coin changer 105 is cut off so that no more coins will be accepted and signal light 83 is lit. Filling solenoids 100, 102, dispensing solenoids 120, 122, container stretching solenoids 80, 82 and closure shifting solenoid 164, all of which are shown in Fig. 1, are connected with the control system as shown in Fig. 7.

Manually actuated double throw switches 107, 109 are provided in series with safety switch 79 and solenoids 100, 102, 120, 122 to permit energization of each individual solenoid independently of the control system when containers 24, 26 are being removed from or inserted in the machine.

The machine is prepared for operation by placing in the insulated chamber conventional dispensing milk or beverage cans 16, 18 to nipples 20, 22 of which the measuring containers 24, 26 have previously been secured at the time when the cans were filled, containers 24, 26 being rolled up in the cavities adjacent nipples 20, 22 for shipment, with the hermetic seal of each tubular outlet 36, 38 remaining unbroken to maintain the interior of containers 24, 26 sterile. After beverage cans 16, 18 have been placed in the chamber, container 24 is unrolled from its cavity while manually pinching or compressing tubular inlet 28. Switch 107 is closed manually to energize solenoid 100, withdrawing plunger 104 and permitting the container to be inserted in the position shown in Fig. 1. Switch 107 is then released, permitting the plunger 104 to be closed by spring 108 and seal the inlet against pad 88. Similarly, switch 109 is actuated to energize solenoid 120, permitting tubular outlet 36 to be threaded into place with flange 40 seated in clamp 56 and with the hermetic seal adjacent the aperture in the bottom of the refrigerated chamber. Release of switch 109 permits plunger 124 to seal the outlet. Outlet 36 is then severed or torn between the hermetic seal and flange 40 which is seated in clamp 56. Container 26 which is connected to can 18 is inserted in place in the machine in a similar fashion by manually actuating switches 107 and 109 to energize solenoids 102 and 122. Switches 107 and 109 may then each be actuated a second time to energize solenoids 100, 102 to permit beverage to flow from cans 16 and 18 into measuring containers 24 and 26 by gravity so that they bear against feeler arms 144, 146 and urge limit switches 140, 140a and 142, 142a, respectively, to the positions shown in Fig. 7. The initial filling of containers 24, 26 is best carried out by manually actuating switches 107, 109 as described above in order to insure that whatever slight amount of air may be present in the containers is permitted to bubble out through inlets 28, 30. Timer switch 87 is opened to permit operation of the control system until the chamber attains the temperature required to open thermostat switch 85.

When the machine contains two full supply cans of beverage, actuation of coin switch 89 by the proper coin will cause the switch to be momentarily closed, energizing vending relay 93 and counter 95 through normally closed cam switch 101a and closing contacts 93a–d. The closing of contact 93b locks relay 93 into the power circuit through normally closed contact 101c–1 of cam switch 101c, so that when the coin passes switch 89 and the switch opens again, relay 93 will remain energized. Similarly, counter 95 will remain energized through normally closed cam switch 101a.

The closing of contact 93a energizes motor 81 through safety switch 79 closed on contact 79–1, cam switch 101c closed on contact 101c–1, and closed relay contacts 93b and 93a. Motor 81 continues to run throughout the cycle of operation of the machine, being arranged to open switch 79 on contact 79–1 only if it continues to run for longer than the normal operating cycle of the machine, for example, if motor 81 runs for two seconds longer than the normal operating cycle, thus avoiding loss of beverage. The closing of contact 93c forms a current path with safety switch 79 closed on contact 79–1 to energize motor 101, beginning the rotation of cams 101a–d in a clockwise direction. Opening of contact 93d on contact 93d–1 deenergizes coin changer 105, thus preventing the machine from accepting any more coins until the cycle of operation is complete, while closing of contact 93d on contact 93d–2 energizes filling solenoid 102 through cam switch 101b closed on contact 101b–1 and contact 97a normally closed on contact 97a–1. Energization of solenoid 102 opens the inlet to container 26, thus ensuring that the container will be filled with beverage from supply can 18. Closing of contact 93d on contact 93d–2 also energizes closure shifting solenoid 164 to withdraw closure 158 from dispensing aperture 156. A cup may be placed in position beneath aperture 156 either manually or by means of a suitable conventional automatic cup dispenser (not shown).

Cam switches 101a–d are so arranged that switch 101a opens almost immediately after the starting of motor 101, thus opening the circuit to counter 95, the pulse serving to actuate the counter, which indicates the number of operating cycles which have been carried out and serves to indicate to a serviceman the quantity of beverage left in the supply cans. Opening of switch 101a, which is maintained in open position by its cam until almost the end of the cycle, also serves to open the circuit to latching relay 97, preventing its energization when limit switch 142 closes momentarily while the contents of container 26 are being dispensed. Accordingly, the several contacts 97a–c remain in the position shown throughout the dispensing cycle.

At a predetermined time after starting of motor 101, desirably about two seconds, cam switch 101b is opened on contact 101b–1 and closed on contact 101b–2. Opening of contact 101b–1 deenergizes solenoid 102, shutting off the inlet to container 26. Closing of contact 101b–2 energizes dispensing solenoid 122 through safety switch 79 closed on contact 79–1, vending relay contact 93d closed on contact 93d–2 and latching relay contact 97b normally closed on contact 97b–1. Energization of solenoid 122 opens outlet 38, permitting the contents of container 26 to be dispensed by gravity through aperture 156.

Cam switch 101b remains closed on contact 101b–2 for a predetermined period of time, say four seconds, to permit emptying of container 26, after which it closes again on contact 101b–1, sealing outlet 38 and opening inlet 30 for the remainder of the cycle to permit container 26 again to fill with liquid beverage from supply tank or can 18.

Cam switch 101d is arranged to close its switch shortly after cam switch 101b closes on contact 101b–2, the delay period preferably being of the order of one second. As cam switch 101d closes, solenoid 82 is energized through contact 97c normally closed on contact 97c–1, pivoting hanger arm 62 about its pivot 66 and stretching container 26 between flange 34 (which is held against the upper face of subframe 14) and flange 42 which is mounted in clamp 56 secured to cover plate 52, which in turn is secured to hanger arm 60. Because of the thin, flexible nature of the measuring container 24, this stretching action tends to constrict the container and aid in ejecting its contents. As cam 101b rotates to the position where its switch again closes on contact 101b–1 to seal the outlet of container 26 and open the inlet, cam 101d simultaneously reaches a position where its switch again is opened, deenergizing solenoid 82 so that container 26 no longer is stretched and may readily be filled by gravity from tank 18.

As motor 101 continues to run and the cams approach the end of a single revolution, cam 101c moves its switch from contact 101c–1 to contact 101c–2, thus deenergizing vend relay 93, permitting contacts 93a–d to return to the position shown in Fig. 8. Opening of contact 93c does not stop motor 101, however, since it continues to be energized through safety switch 79 closed on 79–1 and cam switch 101c now closed on 101c–2 until the tip of the cam rides over the switch.

Opening of contact 93a deenergizes motor 81, which automatically returns to zero setting in preparation for the next dispensing cycle. Opening of contact 93b has no effect, since 101c–1 is now open, but opening of contact 93d on 93d–2 deenergizes filling solenoid 102, sealing the inlet to container 26, and also deenergizes solenoid 164 permitting spring 166 to return closure 158 to its position over aperture 156.

When the tip of cam 101c rides over the switch permitting it to close again on contact 101c–1 motor 101 stops, since both 101c–2 and 93b are now open. All of the cam switches and relay contacts are now back in their original position.

The machine is now ready to start another cycle upon insertion of a coin to close coin switch 89, the machine continuing sequentially to dispense the same measured quantity of liquid from supply tank 18 at each actuation until the supply is exhausted.

When the supply of beverage in can 18 is exhausted, limit switch 142 will no longer be held open by the pressure of container 26 as shown in Fig. 8, but instead will be closed. Accordingly, when a coin is inserted to close switch 89, the initial sequence of operations will be the same, causing contacts 93a, 93b, and 93c to close, and closing 93d on 93d–2, thus energizing solenoid 164 to retract closure 158. However, a current path will now be formed through safety switch 79 closed on 79–1, closed contact 93c and closed switch 142 to energize latching relay 97, thus closing contacts 97a, 97b, and 97c on contacts 97a–2, 97b–2, and 97c–2, respectively. When once energized, relay 97 remains latched in position with the contacts as indicated above until released by energization of release coil 99. The operation of the cam switches proceeds in the same manner as described above, but filling solenoid 100 is actuated through now-closed contact 97a–2 while the circuit to filling solenoid 102 is broken by open contact 97a–1. Similarly, dispensing solenoid 120 is energized through now-closed contact 97b–2 when cam switch 101b closes on contact 101b–2, while dispensing solenoid 122 remains unenergized by reason of now-open contact 97b–1. Container-stretching solenoid 80 is actuated through now-closed contact 97c–2 when cam switch 101d closes, while now-open contact 97c–1 prevents energization of stretching solenoid 82. The operation of cam switch 101a which opens immediately after motor 101 starts prevents energization of release coil 99 when limit switch 140 closes during the dispensing operation. Cam switch 101c terminates the cycle in the same manner as before.

Since relay 97 remains latched in position, repeated actuation of the machine by coins passing coin switch 89 will cause the cycle to be repeated as described above, a measured quantity of beverage being dispensed from supply tank 6 at each actuation. If the supply in tank 18 is meanwhile replenished, the opening of limit switch 142 will have no effect upon the operation of the machine.

When the supply in can 16 becomes exhausted, limit switch 140 remains closed. If the supply in can 18 has meanwhile been replenished, passage of a coin past switch 89 will cause closing of contacts 93a–d as described above, thus establishing a closed current path through safety switch 79 closed on 79–1, contact 93c, closed limit switch 140, release coil 99, and closed cam switch 101a. Energization of release coil 99 unlatches relay 97, permitting its associated contacts to resume the position shown in Fig. 8 so that operation is transferred back to container 26 and supply can 18.

It should be noted that this arrangement permits the replacement of an empty beverage can with a full one at any time after it has been emptied since, because of the latching action of relay 97, the machine will continue to operate to dispense beverage from the same supply can on which it has started and is not affected by the condition (i.e., full or empty) of the remaining can.

Limit switches 140a and 142a are actuated along with switches 140 and 142 by containers 24 and 26, and are shown in Fig. 8 in the position in which they are held when both containers 24 and 26 are full. Opening of either of these switches on contacts 140a–2 or 142a–2 while beverage is being dispensed will have no effect, since vending relay contact 93d is open on contact 93d–1 during operation. If the supply in one can only, for example can 18, is exhausted, switch 142a will open on contact 142a–2 and close on 142a–1. This likewise will have no effect since 140a–1 is open and 140a–2 is closed to energize coin changer 105 through normally closed cup switch contact 103–1 and normally closed relay contact 93d–1. In similar fashion, when the supply in can 16 only is exhausted, coin changer 105 will be energized through closed contacts 140a–1 and 142a–2. If the supply in both cans is exhausted, however, both 140a–2 and 142a–2 will open, deenergizing coin changer 105, and both 140a–1 and 142a–1 will close to energize indicator light 83. Deenergization of the coin changer prevents acceptance of coins, thus effectively rendering inoperative the means for actuating the dispensing mechanism and deactivating the machine.

In the case of the modification shown in Fig. 7, the electrical circuit is the same as shown in Fig. 8 except that solenoids 80, 82 and their associated switches 101d and 97c are omitted. The operation of the device remains essentially the same, limit switches 140, 140a, 142 and 142a opening and closing in the same way in response to the filling and emptying of containers 24 and 26. In this case, however, containers 24 and 26 remain constantly under tension from springs 71, this tension being overcome by the swelling and consequent shortening of containers 24, 26 when inlets 28, 30 are opened to permit them to fill with beverage.

The circuitry employed for operating the modifications shown in Figs. 9–16 is the same as that shown in Fig. 8 except that stretching solenoids 80, 82 and closure shifting solenoid 164 together with their associated switches 101d and 97c are omitted.

In cleaning these modifications of the invention, the front door 229 of the insulated chamber may be opened and linkages 205, 207 may be removed by lifting them vertically upward, after which rollers 217 and 219 may be removed endwise from their shafts 222 and 226, while rollers 216 and 218 are removed together with their shafts 220 and 224 from the cross bars 227, 228. Actuating arms 204, 206 may be removed simply by pulling them endwise out of engagement from spring clips 208, 208. Weights 248 may be dropped out of dispensing aperture 156 when measuring container 24 is removed from keyhole slot 256. Plunger 242 is simply withdrawn from bushing 244.

In the case of the embodiment shown in Figs. 14–16, leaf spring 264 may be lifted off cross bar 228 after roll 219 has been removed from shaft 226 and drip deflector 270 may be lifted off its supporting studs.

All of the parts removed may be cleaned and sterilized in any convenient manner before being replaced. As will readily be apparent, removal and replacement of all of these parts and of supply tanks 16, 18 are readily carried out without tools. In addition, their removal permits ready access to the entire interior of the insulated chamber for the purpose of cleaning it. Furthermore, since solenoids 100, 102 and limit switches 140, 140a are all mounted on a single panel support member 198, the latter may carry some of the circuitry and be provided with a plug-in connector 260 for connecting to the remainder of the circuit, thus facilitating servicing in the event of trouble.

The gradually increasing cross-sectional diameter of the tubular inlet at the top of each measuring container 24, 26, as best shown in Fig. 6, facilitates filling of these containers by eliminating entrapment of air within the containers. Because of the flexible, collapsible nature of the containers 24, 26, they are substantially completely collapsed after each dispensing operation so that very little air need be displaced by bubbling up through the tubular inlet during a subsequent filling operation. This accelerates greatly the filling time required, ensuring rapid operation of the device to provide the same predetermined measured quantity of beverage at each dispensing operation. In practice, it has been found that the machine operates satisfactorily to deliver eight ounces of beverage in a total cycle time of ten seconds. During each cycle, the inlet to the measuring container remains open for the first two seconds, then is closed for four seconds while the outlet is open. The stretching solenoid is actuated during the last three seconds of this four-second period. The outlet is then closed and the inlet reopened for the remaining four seconds of the cycle.

In the event that it is not desired to provide for automatic change-over to the second supply tank when the first is exhausted, but instead to supply a choice of two different flavors from the two different tanks, a manually actuated three-pole change-over switch 300, 300a, 300b is provided in the circuit as shown in Figs. 17 and 18. This change-over switch may be pre-set to either of two positions before the machine is placed in operation. When switch 300 is closed on contact 300–1, the device is set for automatic change-over controlled by limit switches 140, 142, as in the case of the embodiment shown in Fig. 8. When switch 300 is closed on contact 300–2, however, beverage may be selectively dispensed from either of the two supply tanks by manually closing selector switch 302 on either contact 302–1 or 302–2, as desired, to close the circuit to either latching relay 97 or release coil 99, respectively.

In this embodiment, as shown in Fig. 18, indicator light 83 is in series with empty cup switch 103 to indicate when the machine is sold out, the same as in the embodiment of Fig. 8, but limit switches 140a and 142a are in parallel with each other and two extra indicator lights 83a and 83b are provided to show which of the tanks is empty, light 83a being actuated when switch 140a closes on contact 140a–1 and light 83b being actuated when switch 142a closes on contact 142a–1. When the beverage supply tanks are full, switch 140a is normally closed on contact 140a–2 and switch 142a is normally closed on contact 142a–2 as shown in Fig. 18. Change-over switch 300 carries two additional poles 300a and 300b which are in series with switches 140a and 142a, respectively, and which are closed on contacts 300a–1 and 300b–1 when the machine is set for automatic change-over, forming a closed circuit through coin changer 105 so that the machine operates the same as the embodiment of Fig. 8.

When switch 300 is manually pre-set to permit a choice of supply tanks by the customer, poles 300a and 300b are closed on contacts 300a–2 and 300b–2. A second pole 302a of selector switch 302 is in series with these two contacts and may be moved manually to close either on contact 302a–1 to close the circuit to coin changer 105 through switch 142a, permitting beverage to be drawn from tank 18, or on contact 302a–2 to close the circuit through switch 140a, permitting beverage to be drawn from tank 16, as desired. In the event that either tank is empty, of course, the corresponding switch 142a or 140a will open to break the circuit to the coin changer and prevent actuation of the machine, and will also close on contact 142a–1 or 140a–1 to light the respective empty indicator light 83b or 83a as the case may be. The remainder of the circuit and operation thereof are the same as in the embodiment shown in Fig. 8.

It will be understood that either tank 16 or tank 18 may be replaced if desired with two or more separate tanks containing separate materials to be mixed together in the serving cup into which they are dispensed. For example, one such can may contain orange juice concentrate and the other water, each can being provided with its own flexible measuring container of predetermined size. Both such measuring containers are controlled simultaneously by solenoids 100, 120 to dispense together into a single cup, the mixing being carried out in the cup.

This application is a continuation in part of my co-pending application Serial No. 490,243, filed February 24, 1955, now abandoned.

Although specific embodiments of the invention have been described herein, it is not intended to limit the invention solely thereto, but to include all of the obvious variations and modifications within the spirit and scope of the appended claims.

I claim:

1. A machine for intermittently dispensing measured quantities of a liquid such as milk which comprises a chamber for holding a plurality of supply tanks of said liquid, said chamber having at least one outlet aperture and each tank being adapted to deliver milk through a conduit to said aperture, sealing means in said chamber for sealing each said conduit at spaced-apart zones along its length, means for intermittently actuating the sealing means for one conduit at a time to trap and deliver a measured quantity of liquid from the corresponding supply tank, and means responsive to the trapping of liquid in said conduits for transferring the operation of said actuating means from the sealing means for one conduit to the sealing means for another conduit when the supply of liquid to said one conduit is exhausted.

2. A machine for dispensing measured quantities of a beverage which comprises an insulated chamber for holding a plurality of supply tanks of said beverage, said chamber having an outlet aperture, dispensing means in said chamber for each supply tank adapted to dispense intermittently measured quantities of beverage through said aperture, actuating means for intermittently actuating one of said dispensing means at a time, and means responsive to the action of each said dispensing means for transferring the operation of said actuating means to another of said dispensing means when the supply of beverage to one dispensing means is exhausted.

3. A machine as defined in claim 2 comprising in addition means responsive to the action of the dispensing means for rendering said actuating means inoperative when the supply of beverage to all said dispensing means is exhausted.

4. A machine as defined in claim 2 comprising in addition thermostatic means responsive to the temperature in said insulated chamber for rendering inoperative said actuating means when the temperature varies from a predetermined level, and means for deactivating said thermostatic means for a predetermined initial time period to permit said chamber to attain the desired temperature.

5. A machine for dispensing measured quantities of a liquid, which comprises a chamber for holding at least one supply tank of said liquid, said chamber having at least one outlet aperture and each tank being adapted to deliver liquid through said aperture and through a flexible, collapsible measuring container having an inlet and an outlet, means for releasably sealing said inlet and said outlet in timed sequence to provide for filling the container through its inlet from the tank while its outlet is closed and to dispense the contents of the container through its outlet while its inlet is closed, and yielding means for applying stretching tension uniformly to the container longitudinally from its inlet toward its outlet to urge it to a collapsed condition while its contents are being dispensed.

6. A machine for sequentially dispensing a measured quantity of a liquid beverage from one of a plurality of liquid supply tanks, each tank being adapted to dispense liquid through a collapsible, flexible measuring container having an inlet connected to said supply tank and an outlet adapted to dispense said liquid, said machine comprising means for releasably sealing each said inlet and outlet, means for actuating said sealing means in timed sequence to seal the outlet of a container while its inlet is open to fill the container with liquid and to seal the inlet of said container while its outlet is open to dispense the contents of said container, and means responsive to the filling of each container to transfer the operation of said actuating means from one container, when its corresponding supply has been exhausted, to a different container.

7. A machine as defined in claim 6 including indicating means responsive to the filling of each container to indicate when said supply tanks are empty.

8. A machine for dispensing measured quantities of a beverage such as milk from a beverage supply tank having a collapsible, flexible measuring container with an inlet connected to said supply tank and an outlet adapted to dispense said beverage, said machine comprising means for releasably sealing said inlet and outlet, means for actuating said sealing means in timed sequence to seal said outlet while said inlet is open to fill said container with beverage and to seal said inlet while said outlet is open to dispense the contents of said container, and yielding means for applying stretching tension uniformly to said container longitudinally from said inlet toward said outlet while said outlet is open to facilitate the collapse of the container and the dispensing of its contents.

9. A machine as defined in claim 8 in which said means for releasably sealing the inlet and outlet includes one pair of opposing rotatable rollers arranged to nip said inlet between them and a second pair of opposing rotatable rollers arranged to nip said outlet between them, one roller of each pair being mounted for movement to and from a sealing position in which it is yieldingly urged against the opposing roller and an open position in which it is spaced from the opposing roller, and means for moving said rollers to and from sealing position and open position.

10. A machine as defined in claim 9 in which said stretching means comprises means for securing said inlet in fixed position and a weight releasably secured to said measuring container adjacent its outlet to maintain the container under tension from said fixed inlet.

11. A machine as defined in claim 10 including means for guiding the movement of said weight while secured to said measuring container.

12. A machine as defined in claim 9 in which said stretching means comprises means for securing said inlet in fixed position and a spring releasably secured to said measuring container adjacent one end thereof to maintain the container under tension from said fixed inlet.

13. A machine for dispensing measured quantities of a beverage such as milk from a beverage supply tank having a collapsible, flexible measuring container mounted below said supply tank and having an inlet connected thereto and an outlet below said inlet adapted to dispense said beverage, said machine comprising means for releasably sealing said inlet and outlet, means for actuating said sealing means in timed sequence to seal said outlet while said inlet is open to fill said container with beverage by gravity from said supply and to seal said inlet while said outlet is open to dispense the contents of said container by gravity while collapsing said container, and, to facilitate and accelerate collapse of the container and the dispensing of its contents, yielding means for applying stretching tension uniformly to said container longitudinally from said inlet toward said outlet.

14. A machine for dispensing measured quantities of a beverage comprising a refrigerated chamber having an outlet aperture, a supply tank of beverage within said chamber, a collapsible, flexible measuring container mounted within said chamber below the supply tank, said container having a wall of polyethylene material not over five mils thick and having a tubular inlet at its upper end connected to said supply tank and a tubular outlet at its lower end adjacent the outlet aperture of said chamber, at least said inlet tube being of gradually increasing diameter in a direction toward said container, each said inlet and outlet tube having secured thereto a relatively rigid annular flange, mounting means in said chamber for engaging each said flange to support said container in position, said mounting means being movable toward and away from each other to tension said container between said flanges, means for releasably sealingly clamping each said tubular inlet and outlet, means for actuating said clamping means in timed sequence to open said inlet while said outlet is sealed to fill said container with beverage from said tank by gravity and to open said outlet while said inlet is sealed to dispense the contents of said container by gravity through said aperture, means for moving said mounting means apart in timed relation to said actuating means to stretch said container between said flanges while its tubular outlet is open to facilitate the dispensing of beverage therefrom, a closure for said aperture movably mounted for movement to and from an open and a closed position, and means for moving said closure in timed relation to said actuating means to open said closure while the beverage is being dispensed and to close it when the dispensing operation is complete.

15. A machine as defined in claim 14 comprising a plurality of supply tanks within said chamber, each said tank having a collapsible, flexible measuring container associated therewith, and means responsive to the filling of each said container to transfer the operation of said actuating means from one container to a different container when the supply of beverage to said one container is exhausted.

References Cited in the file of this patent

UNITED STATES PATENTS

| | | |
|---|---|---|
| 1,285,497 | Wallace et al. | Nov. 19, 1918 |
| 1,554,364 | Norris | Sept. 22, 1925 |
| 2,499,206 | Wolff | Feb. 28, 1950 |
| 2,554,570 | Harvey | May 29, 1951 |
| 2,593,151 | Johnson | Apr. 15, 1952 |
| 2,627,369 | St. Laurence | Feb. 3, 1953 |
| 2,654,517 | Corradini et al. | Oct. 6, 1953 |
| 2,669,941 | Stafford | Feb. 23, 1954 |
| 2,689,530 | Harvey | Sept. 21, 1954 |
| 2,747,782 | Booth | May 29, 1956 |